F. CUMONT.
ARRANGEMENT FOR STARTING AND REGULATING DIRECT CURRENT ELECTRIC MOTORS.
APPLICATION FILED JUNE 6, 1912.
1,188,905.
Patented June 27, 1916.
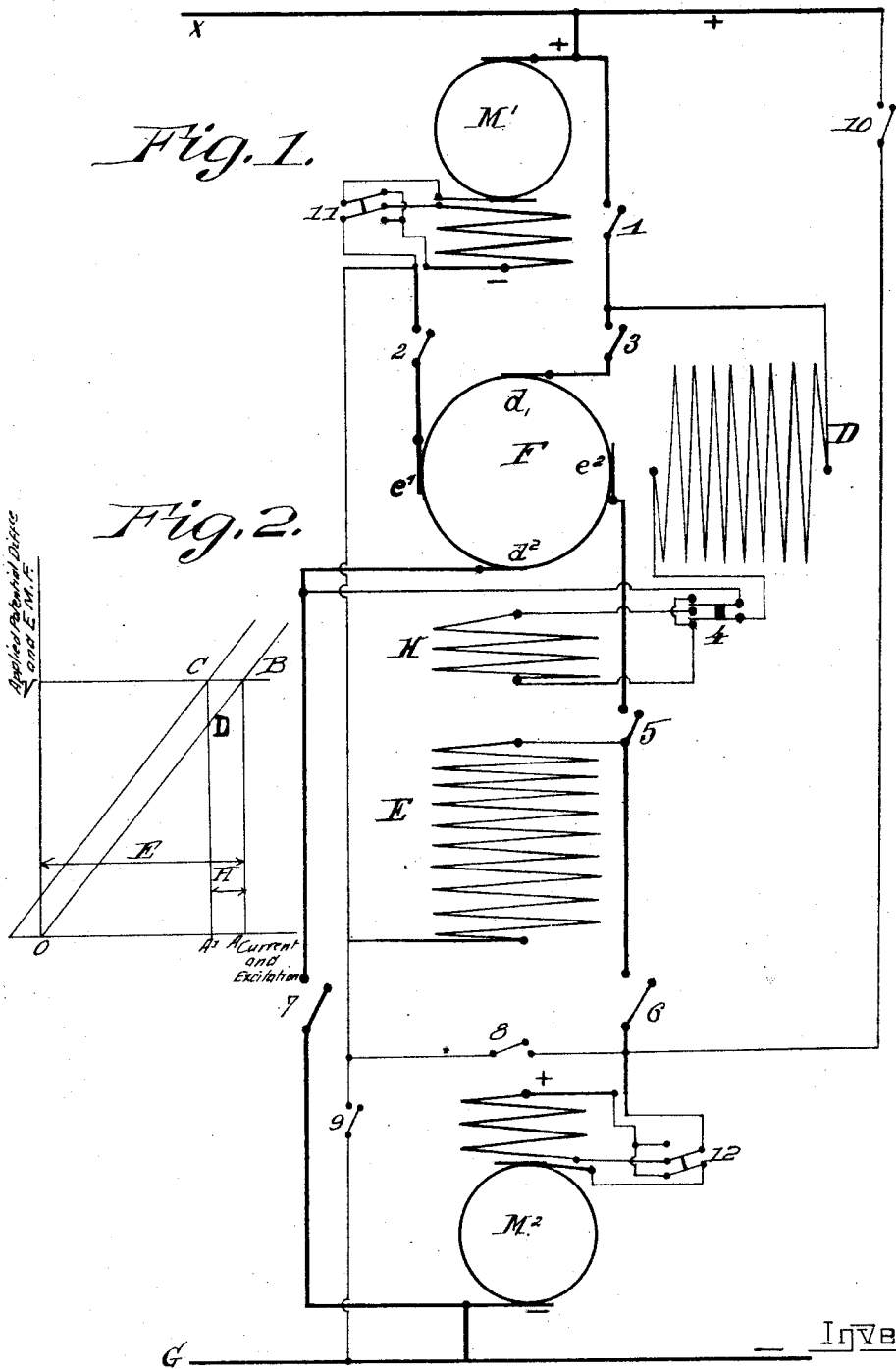
Witnesses
Charles McCallum
Alfred McDonald.
Inventor
F. Cumont
By his Attorney
W. P. Thompson

UNITED STATES PATENT OFFICE.

FERNAND CUMONT, OF PARIS, FRANCE, ASSIGNOR TO SOCIÉTÉ S. T. A. R. (SYSTÈME DE TRACTION AUTO-REGULATEUR), OF PARIS, FRANCE.

ARRANGEMENT FOR STARTING AND REGULATING DIRECT-CURRENT ELECTRIC MOTORS.

1,188,905.

Specification of Letters Patent. Patented June 27, 1916.

Application filed June 6, 1912. Serial No. 702,074.

*To all whom it may concern:*

Be it known that I, FERNAND CUMONT, a citizen of the Republic of France, residing at Paris, in the Republic of France, have invented certain new and useful Improvements in an Arrangement for Starting and Regulating Direct-Current Electric Motors, of which the following is a description.

There have been proposed hitherto many methods of effecting the starting and speed regulation of continuous current motors without having recourse to the use of resistances which absorb as pure loss a certain amount of energy. Several of these methods also permit, under certain conditions, regenerative working, transforming the stored up kinetic energy into electrical energy which is given back to the line, but no one of them has solved in a simple manner the problem of regenerative working with motors having series excitation which are so commonly used for traction.

The starting of continuous current motors without the use of resistances has been carried out by inserting between the source of current and the driving motor an electromotive force produced by an auxiliary dynamo with separate excitation, this electromotive force being variable progressively and being reversible so that the voltage applied to the driving motor can be made to vary, for example, from zero to the line voltage, and then, by reversing this electromotive force, up to double the line voltage. The variation and reversal of this electromotive force were produced by hand by the regulation and reversal of the separate excitation of the auxiliary dynamo.

The invention forming the object of the present application provides for the obtaining in an entirely automatic manner the variation within wide limits and the reversal of the auxiliary electro-motive force, and consequently provides for the obtaining of automatic starting of the driving motor or motors. It also provides for the production of regenerative working, regardless of the method of excitation of the motors.

In accordance with this invention an apparatus of special construction as subsequently described is inserted in the circuit of the motor or motors. The invention will be explained by the aid of the accompanying drawings, in which:—

Figure 1 is a diagram of connections showing the invention applied to a pair of series motors; and Fig. 2 is a diagram used for explaining the characteristics of one part of the apparatus.

The arrangement connected with the motors comprises a rotary apparatus which, as shown in the diagram, Fig. 1, consists of a four-pole machine having three field windings D, E, H, and a single armature F identical with the armatures of ordinary direct current dynamos. With this armature two pairs of brushes $d^1$, $d^2$ and $e^1$ $e^2$ co-act. Although shown as a single machine, the apparatus is the equivalent of two machines mechanically coupled and its action will be explained by considering these two machines.

One of these machines has the function of insuring a practically constant speed of rotation for the apparatus. The other machine, which may be called the regulator, is a continuous current machine with an ordinary armature, but having two exciting windings E and H. The winding E is a shunt winding connected to the brushes $e^1$ $e^2$ of the regulator. The second winding H is traversed by a constant current.

The coördinates of the diagram, Fig. 2, represent respectively the voltage at the brushes $e^1$ $e^2$ and the ampere turns of the excitation of the regulator. Thus the winding H will be considered as out of action.

The relation between the ampere turns of the winding E and the voltage applied to the brushes $e^1$ $e^2$ will be shown by a straight line, such as O B. It will be understood that the slope of this line can be made to vary by varying the resistance of the circuit of the winding E.

The no-load characteristic of the regulator for the unsaturated part of the magnetization is very approximately a straight line, and by adjusting the resistance of the circuit E, or by adjusting the speed of the regulator shunt, the excitation characteristic may be made to coincide with the straight line part of the no-load characteristic of the regulator, both characteristics being represented by the line O B. The winding E is connected in such a way that it produces electro-motive force opposed in direction to the voltage applied at the terminals.

Leaving out of consideration the no-load losses it will be evident that whatever may be the voltage V applied to the brushes $e^1 e^2$, provided that it is below the saturation limit of the regulator, the shunt winding E will give rise to the production in the armature of an electro-motive force equal and opposite to the applied voltage. Under these circumstances the machine would not be capable of giving out or taking in under-current.

If now the winding H be taken into consideration and the armature reaction be neglected, since it can in any case be compensated for in well known manner, it will be seen that this winding gives rise to an additional electro-motive force in the armature which causes the passage through the armature of the current of constant value, the direction of flow of this current and accordingly the functioning of this part of the apparatus as a motor or generator, depending upon whether the ampere-turns of the winding H oppose or assist the ampere-turns of the winding E. This will be made more evident by the following:—If V be the voltage applied to the terminals $e^1 e^2$; E' and H' the electromotive forces produced by the windings E and H respectively; I the current supplied to the machine; and R the ohmic resistance of the armature; we shall have the relation $$V = E' - H' + IR.$$

But since, as we have seen, the electromotive force due to the winding E always balances the applied voltage, we have $$H' = IR.$$

It is accordingly obvious that the winding H, in view of the electro-motive force H' due to it, causes the passage of a current I of such magnitude that the ohmic drop of potential which it produces in the armature of the regulator balances the electro-motive force H'.

In the diagram, Fig. 2, A B or A' C represents the electro-motive force E'=V; the ampere-turns H (represented by C B) produce an electro-motive force C D opposed to E', and this electro-motive force C D is balanced by the drop of potential DC=IR. The length of D C can accordingly serve as a measure of the current I.

Since the value of H remains constant, whatever may be the value of V and provided that the regulator works in the non-saturated part of its magnetization, the straight line C D will remain of constant length and the same current I will pass through the machine.

It is readily seen that these working conditions are stable. If it be supposed that owing to some accidental circumstance the current I increases, since H is kept constant, the electro-motive force H' to which it gives rise will no longer be able to balance the fall of potential IR which has increased. Accordingly the value of the expression $$E' - H' + IR$$

will tend to become greater than the voltage V applied to the regulator, and this would have as a result the reduction of the current taken. The inverse action would take place if an accidental diminution of current occurred.

Assuming now that the ampere-turns produced by the winding H are of the same sense as those of the winding E; under these conditions the electro-motive force of the regulator is greater than the voltage applied to the terminals, and the machine gives out a current I to the line and works as a generator. We then have the relation $$E' + H' = V + IR$$

and since E' always balances V, we can still write $$H' = IR.$$

It will be a simple matter to make a diagram analogous to that of Fig. 2 showing H in the opposite sense to C B, and it would then be seen in exactly the same way that the current I remains constant within the same limits of variation of voltage and, while the ampere-turns H are constant it could also be shown in an analogous manner that in this case also the conditions of working are stable.

Although in reality the actions of the windings E and H cannot be separated, we can, in order to more clearly understand the properties of the regulator, speak as if while the machine works in the non-saturated part of its magnetization, its excitation will act as if: The shunt winding E produces by its variable ampere turns, a counter-electro-motive force always balancing the voltage V applied at the terminals of the regulator. The independent winding H, of which the ampere-turns have a constant value, produces and maintains through the regulator a current of constant value, the sense of the ampere-turns of the winding H determining the sense of the current.

The regulator arranged to work within the limits indicated is a machine which automatically gives out or takes in a constant current whatever may be the voltage applied to its terminals.

It is evident that when the regulator works as a generator the machine with which it is mechanically coupled will work as a motor, and vice versa.

The two parts which have been discussed above as forming separate machines are, in the example indicated in Fig. 1 of the drawings, formed as a single machine, the field structure of which carries two excitations, one indicated by the winding D and the other by the windings H and E, and these two excitations are displaced by 90 electrical degrees relative to each other. The single armature F also has two sets of brushes also displaced by 90 electrical degrees relative to each other, the brushes $e^1$ $e^2$ corresponding to the field excitation H E and the brushes $d^1$ $d^2$ corresponding to the field excitation D.

The mounting of the foregoing elements and the general electrical arrangement are such that starting may be carried out in the following way: 1. The terminals of the field windings D and H are placed in communication with the two supply-terminals by closing the switches 1, 4 and 7. 2. One terminal of the field winding E being in contact with the negative terminal of the motor $M^1$ and all communication between the brush $e^1$ and the said negative terminal being cut off because the switch 2 is open the other terminal of the said field winding E is brought into connection with the positive terminal of the motor $M^2$ by closing switch 6. Under these conditions the current which flows through the field winding E and is of small amount by reason of the high resistance of the latter, passes through the motors $M^1$ and $M^2$, but is insufficient to start them. The direction of this field current is such that the pressure at the terminals $e^1$, $e^2$, of the second dynamo E, F, is in opposition to that of the line. The ampere-turns of the winding H are in opposition to those of the winding E. This is arranged by closing the switch 4 in the proper direction. The resultant excitation is such that the voltage at the brushes $e^1$, $e^2$, is lower than that of the line. 3. The two brushes $d^1$ and $d^2$ are placed with the usual precautions in communication with the positive and negative supply terminals by closing the switch 3. At this moment the armature F commences to revolve like the armature of an unloaded motor. 4. When the armature F has attained its regulation speed, the brushes of the dynamo E F are put into circuit by closing the switches 2 and 5, the positive brush $e^1$ with the negative terminal of the motor $M^1$ and the negative brush $e^2$ with the positive terminal of the motor $M^2$, and the voltage of the dynamo E F is regulated so that the current admitted is that required for starting. This dynamo E F at this stage acts as a motor. As its armature F is also the armature of the first dynamo D F, the latter then acts as a generator and supplies current to the line, the amperes thus returned being slightly smaller in number than those absorbed by the motors $M^1$ and $M^2$ at the commencement of the starting, by reason of the "no-load" losses of the apparatus D E H F.

If the voltage at the terminals of the dynamo E F remained constant, the motors $M^1$ and $M^2$ could not increase their speed because if the speed of the said motors increased their back E. M. F.'s would go on increasing and the current passing through them would diminish. It is, however, necessary that this current should remain constant in order to insure the starting and this constancy is obtained automatically by means of the field winding E the excitation of which decreases continuously by reason of its arrangement in shunt on the brushes $e^1$, $e^2$. If, however, the excitation of the winding E diminishes, the motor E F gives less power which is shown by a less supply from the generator D F to the line, and hence there is a gradual increase of the amperes furnished by the line.

When the difference of potential at the terminals of the dynamo E F is *nil*, the motors $M^1$ and $M^2$ work as if they were coupled in series and it would even be possible at this moment to place the apparatus D E H F out of circuit, the two motors being simply directly connected with one another through the switch 8.

The apparatus D E H F being left in service beyond the moment just considered, the speed of the motors $M^1$ and $M^2$ and consequently the voltage across their terminals, will still increase. A difference of potential is accordingly generated at the terminals of the dynamo E F, but the resultant voltage is reversed, the direction of the current in the field winding E being reversed, its ampere turns acting now in the same direction as those of the winding H and the E. M. F. of the dynamo E F is in the same direction as that of the line. From this moment onward this machine acts as a generator; it is driven by the machine D F which then acts as a motor taking the current which it requires from the line X. The consequence of this is the continuance of the regular increase of the current furnished by the line.

By allowing the motors $M^1$ and $M^2$ to accelerate the difference of potential at the terminals of the dynamo E F as well as the current absorbed by the machine D F will increase, and when this difference of potential corresponds to the voltage of the line the motors $M^1$ and $M^2$ may be directly coupled in parallel by the switches 9 and 10 while the apparatus D E H F may be placed out of circuit.

From the foregoing description it is evident that the starting of the motors $M^1$ and $M^2$ is carried out automatically owing to the part played by the field windings E and H. The supplementary winding H is, however, only indispensable if this automatic property is required.

It is evident that if the automatic control of the starting was not perfect, it might be remedied by acting by any suitable means either on the winding H or on the winding E or on both these windings simultaneously by the insertion of resistances or by shunting or cutting out turns of the windings or by the simultaneous use of both these means.

It has been hereinbefore shown what takes place at the starting of the motors M¹ and M² which may assume a gradually accelerated speed, passing through a point corresponding to coupling in series and proceeding to a point corresponding to coupling in parallel. It is, however, possible to provide at any given moment a desired speed by acting for this purpose on the coil E or the coil H or on both coils simultaneously by inserting resistances, or by shunting or cutting out turns of the windings, or by the use of both means as hereinbefore set forth.

The motors having been coupled in series or in parallel and the apparatus D E H F placed out of circuit, the latter may be again connected with the service at a given moment and then resumes automatically the work which is assigned to it by the conditions of running of the motors at this precise moment.

The way in which the apparatus interpolated in the circuit of the motors M¹ and M² behaves at the moment of the application of the brake, will now be considered.

Assuming (1) that the circuit of the windings D and H is closed across the lines X G, as was hereinbefore stated, i. e., the switches 1, 4 and 7 are closed; (2) that the connections of the motors M¹ and M² between themselves and with the dynamo D E are interrupted, the field winding E being traversed by a current passing through the motors M¹ and M², which current is too weak in view of the resistance of the coil E to have an appreciable effect on the motors M¹, M², i. e. the switch 6 is closed but switches 2 and 5 are not; (3) that the armature F of the dynamo D F is connected across the lines X G the switch 3 being closed and that consequently the armature F, which revolves as an unloaded motor, has attained its regulation speed.

In order to produce the braking, the following operations are performed: 1. The current in the field winding H is reversed by changing over the switch 4 or by any other known method. The ampere-turns of the winding H are and remain of reverse direction to those which are produced during the starting. They are added initially to the ampere-turns of the winding E and the voltage which results therefrom at the terminals of the dynamo E F is opposed to and superior to the line voltage. 2. In the motors M¹ and M², the connections of the armature relatively to the field winding are reversed by reversing switches 11 and 12 and their coupling is therefore suitable for running backward. 3. The connections of the motors M¹ and M² with the dynamo E F and with the feed line X G are reëstablished in the manner hereinbefore explained with reference to the starting by closing switches 2 and 5.

From the foregoing it is evident that the motors M¹ and M² and the apparatus D E H F as a whole will discharge into the feed line; the current produced initially depends on the excess of the voltage of the dynamo E F over the line, which excess is determined accordingly. At this moment the machine E F acts as generator, the machine D F acting as motor in order to supply the necessary torque. The current absorbed by the latter is withdrawn from the current supplied by the former, the difference being *nil* at the no load losses of the whole apparatus D E H F.

The phenomenon hereinbefore described is, however, very unstable because the motors M¹ and M² becoming at once excited become generators in their turn. Consequently the current discharged into the line would almost instantaneously attain a dangerous value because this discharge current increases by reason of an E. M. F. which is started and built up in the motors M¹ and M² and which produces increase of voltage at the terminals of the latter. While during the starting this increase permitted an automatic regulation of the strength of the current produced, it is no longer the same here. It will in fact be noticed that at starting, this variation of voltage was the consequence of the variation in the speed of the motors and the relative slowness of the phenomenon allowed the variations in the voltage of the dynamo E F to follow step by step the variations in the voltage of the motors. On the contrary when the brake is applied, for a very short moment in which the speed may be considered as constant, a rapid—practically instantaneous—variation in the voltage at the terminals of the motors M¹ and M² is experienced. Under these conditions the self-induction of the winding E, being higher than that of the motors, does not allow the voltage of the dynamo E F to be lowered sufficiently rapidly to limit the current supplied. The resultant disadvantages of such an action can be overcome by means disclosed and claimed in my pending applications No. 734542, filed 2nd December 1912; No. 737465, filed 18th December 1912; No. 758212, filed 1st April 1913; No. 812461, filed 16th January 1914; and No. 850047, filed 9th July 1914.

During the period of the building up of the current during braking it will be noticed that: If the speed of the motors is sufficiently high at the moment of the braking, the voltage at the terminals of the machine E F will rapidly decrease and then change direction. At this moment the machine E F becomes the motor and the machine D F the generator in order to counterbalance the motor couple furnished. If the speed of the train is not sufficiently high there is neither reversal of the voltage of the dynamo E F nor reversal of the actions of the two machines D F and E F.

The period of the building up of the braking current being passed and the normal conditions established, the voltage across the terminals of the motors will continue to vary but this time decreasing in consequence of the diminution of the speed of the motors produced by the braking. As it is then again a question, as was previously stated with reference to the starting, of a relatively slow phenomenon, the variation in the voltage across the terminals of the machine E F will follow gradually and automatically the variation in the voltage across the terminals of the motors.

If the speed of the motors is sufficiently high at the moment of commencing the braking action, the machine E F being a motor at the end of the period of the building up of the braking current, its motive power decreases in proportion as the speed of the motors diminishes and the current supplied to line by the machine D F will also decrease. As the speed continues to decrease, the voltage is reversed at the terminals of the machine E F which becomes a generator, and the machine D F then acting as a motor will absorb an increasing current which is withdrawn from the current furnished to the line by the motors $M^1$ and $M^2$, until at the stoppage, these two currents become equal to the no load losses of the apparatus D E H F. At this moment the connections of the motors $M^1$ and $M^2$ with this apparatus are interrupted, and the whole is returned to its original condition in order that, whether the apparatus D E H F continues to run without load or is stopped, a fresh starting may be proceeded with.

If the speed of the train at the moment of commencing braking is not sufficiently high, the machine E F becomes a generator at the end of the period of building up of the current and it remains a generator up to the end of the braking, as has just been described.

The braking action may evidently be dispensed with before the complete stoppage is obtained and similarly the braking action may be graduated by acting either on the winding E or on the winding H or on both.

It has been ascertained that the actions of the machines E F and D F are correlated, both during starting and during braking. When one is the generator, the other is necessarily the motor with an equivalent power, so as to furnish to the first just the torque which is necessary for it, and vice versa, so that although the starting and the braking is obtained with a practically constant current in the circuit of the motors, the supply from the line constantly varies.

At the commencement of the starting, the current restored by the dynamo D F annuls as regards the line the current of fixed strength absorbed by the motors $M^1$ and $M^2$, and as the current restored gradually diminishes, the current which is furnished by the line progressively increases up to the fixed amount carried by the motors which it reaches at the moment when the full series condition of running is attained. The starting continuing under the same conditions, the motors $M^1$ and $M^2$ will remain in series, but the machine D F which has become a motor takes current from the line, the supply from which consequently continues to increase up to double the fixed current of each motor, which it reaches at the moment when the full parallel condition of running is attained, when the motors will be directly coupled with the line. The same explanations apply to the braking.

When the speed of the motors is sufficiently high the current in the two motors in series with one another and with the machine E F, will indeed carry a current of the fixed strength selected, but this current is added to that which the generating machine D F furnishes, it being possible to return to the line current of more than double the fixed strength carried by the motors. Then as the speed of the motors diminishes, the supplementary current given out by the dynamo D F, and consequently the total current recovered, diminishes, the latter being reduced to the fixed current of the motors when the current of the dynamo D F falls to zero. As the slowing up continues, the machine D F becoming the motor, takes back a portion of the constant current furnished by the motors. As this part gradually increases, the regenerated current falls beneath the constant amount carried by the motors and diminishes to zero, at which moment the current absorbed by the machine D F is equal to the constant current passing through the motors $M^1$ and $M^2$.

It will be obvious from the foregoing explanations that the apparatus inserted between the two motors $M^1$ and $M^2$, although forming a perfectly defined whole, behaves in reality relatively to the line and the motors $M^1$ and $M^2$ like two machines, one of which E F acts sometimes as generator sometimes as motor, so as to maintain at the desired level the current which passes through the motors $M^1$ and $M^2$, the other machine D F working in the reverse way sometimes as motor and sometimes as a generator, thus equalizing by its torque that of the first machine and in such a way that the current which passes through it, combining by way of addition or subtraction with the current of fixed strength which passes through the motors $M^1$ and $M^2$ enables the line to furnish or receive just the current which corresponds to the energy which it must necessarily furnish or receive at the moment in question under the conditions then existing. This reversal and this correlation in the action of the machines E F and D F takes place at the desired time and automatically.

The arrangement which forms the object of this invention is capable of numerous applications, more particularly in electric traction; the solution described with reference to the accompanying drawing, meets the general problem of traction with two motors, but it must be evident that the same solution may be employed successfully for starting, regulating the speed, obtaining couplings in series and in parallel, and regenerative action, in groups of motors between which the apparatus D E H F is interposed.

Similarly although it has been hereinbefore specified that this apparatus comprises four poles and two pairs of brushes, it is possible to form an apparatus giving the same technical effects with any suitable number of poles and sets of brushes, the latter being suitably coupled with a view to the object to be attained.

I declare that what I claim is:—

1. An electrical system comprising in combination a motor, mains, connections between the terminals of said motor and the mains, and rotary means inserted in the motor circuit and serving for automatically maintaining constant the value of the current passing through the said circuit, and means for varying the voltage applied to said motor.

2. An electrical system comprising in combination a motor, mains, connections between the terminals of said motor and the mains, apparatus inserted in one of said connections and comprising means for generating a component electro-motive force of fixed value and means for generating a component electro-motive force which is equal to the potential difference applied to said apparatus.

3. An electrical system comprising in combination a motor, mains, connections between the terminals of said motor and the mains, apparatus inserted in one of said connections and comprising means for generating a component electro-motive force of fixed value, means for generating a component electro-motive force which is equal to the potential difference applied to said apparatus, and means for rotating the said apparatus at approximately constant speed.

4. An electrical system comprising in combination a motor, mains, connections between the terminals of said motor and the mains, a rotary machine inserted in one of said connections, a second set of connections between said machine and the mains, said machine comprising means for rotating it at approximately constant speed, means for generating in series with the said motor a component electro-motive force of fixed value and a component electro-motive force which is equal to the difference of voltage of the mains and motor.

5. An electrical system comprising in combination a motor, mains, connections between the terminals of said motor and the mains and a motor-generator apparatus consisting of two parts, one part being connected directly with the mains and the other inserted in one of the connections between the motor and the mains, the latter part having means for maintaining approximately constant current through it.

6. An electrical system comprising in combination a motor, mains, connections between the terminals of said motor and the mains and a motor-generator apparatus consisting of two parts, one of said parts being connected directly with the mains and having exciting means of constant value, and the other part being inserted in one of the connections between the motor and the mains and having two component exciting means, one of constant and the other of variable value.

7. An electrical system comprising in combination a motor, mains, connections between the terminals of said motor and the mains, and a motor-generator apparatus consisting of two parts, one of said parts being connected directly across the mains and having its excitation connected in shunt with it, the other part being inserted in one of the connections between the motor and the mains and having two component excitations, one of them being connected in shunt with said part, and the other having applied to it a constant potential difference.

8. An electrical system comprising in combination a motor, mains, connections between the terminals of said motor and the mains and a motor-generator apparatus consisting of two parts, one of said parts being connected directly with the mains and having exciting means of constant value, and the other part being inserted in one of the connections between the motor and the mains and having two component exciting means, one of constant and the other of variable value, and means for reversing the component of constant value.

9. An electrical system comprising in combination two motors, mains, connections joining said motors in series across said mains, a rotary apparatus comprising two parts, one working with approximately constant current and variable voltage, and the other with approximately constant voltage and variable current, the former being connected in series with the motors, means for reversing the connections of the fields with the armatures of the motors, and means for reversing the direction of the constant current through said rotary apparatus.

10. An electrical system comprising in combination mains working with approximately constant voltage between them, apparatus adapted to work with variable voltage connected with one of said mains, and a motor-generator apparatus consisting of two parts, one of said parts being connected directly with the mains and having exciting means of constant value, and the other part being connected between the first mentioned apparatus and the other main and having means for automatically maintaining approximately constant current through it and for generating an electro-motive force equal to the difference between the voltage of said first mentioned apparatus and the voltage of the mains.

11. An electrical system comprising in combination mains working with approximately constant voltage between them, apparatus adapted to work with variable voltage connected with one of said mains, and a motor-generator apparatus consisting of two parts, one of said parts being connected directly with the mains and having exciting means of constant value, and the other part being connected between the first mentioned apparatus and the other main and having two component exciting means, one of constant, and the other of variable value.

12. An electrical system comprising in combination means for transforming electrical into mechanical energy, supply mains, connections between said means and said mains, a rotary apparatus comprising two parts one working with approximately constant current and variable voltage and the other with approximately constant voltage and variable current, the former being connected in series with the energy transforming means, means for reversing the operation of the energy transforming means so as to transform from mechanical to electrical energy, and means for reversing the direction of the constant current through the said rotary apparatus.

13. An electrical system comprising two separate means for transforming electrical into mechanical energy, a pair of mains, a connection between each of said means and one of said mains and between the two means, a motor-generator apparatus one part of which is inserted in one of said connections and is adapted to work with varying voltage and constant current, and means for putting said part out of connection with said transforming means while maintaining complete the connections between the said two means and the mains, so that the said two means are left in series across the mains.

14. An electrical system comprising in combination mains, two separate means for transforming from mechanical to electrical energy, connections joining one terminal of each of said means to one of the mains and a connection joining together the other terminals of said means, a motor generator apparatus, one part of which is inserted in the last mentioned connection and is adapted to work with varying voltage and constant current, said part being designed to give an electro-motive-force equal to the voltage between the mains, and means for connecting the said energy transforming means in parallel across the mains.

15. A series parallel and regenerative system comprising in combination two motors, mains, connections adapted to join one terminal of each motor to the corresponding main; a third machine comprising a double armature, two sets of brushes, a field winding in shunt across one of said sets of brushes, a second field winding disposed at 90 electrical degrees to the first field winding and in shunt across the other set of brushes and a third field winding acting on the same magnetic circuit as the first field winding; connections adapted to join one of said sets of brushes to the mains and the other set to the terminals of the two motors.

16. A series parallel and regenerative system for two series motors, comprising in combination mains, connections adapted to join one terminal of each motor to a corresponding main, and to connect together the other terminals of the motors, a direct current armature having a pair of brushes inserted in said last named connection, a second pair of brushes directly connected to said mains, and a set of field windings in shunt across said first named pair of brushes, and a second set of field windings in shunt across the second named pair of brushes, and wound in the same plane as said first set of field windings, and a third set of field windings at right-angles to the other two and in series with the second named set.

17. A series parallel and regenerative system for two series motors comprising in combination mains, connections adapted to join one terminal of each motor to a corresponding main and to connect together the other terminals of the motors and a double armature dynamo electric machine having two sets of field windings at right-angles, one set providing a constant excitation while the other set consists of a winding traversed by a constant current and a shunt winding.

18. A series parallel and regenerative system for two series motors, comprising in combination mains, connections adapted to join one terminal of each motor to a corresponding main and to connect together the other terminals of the motors, and a double armature dynamo electric machine having two sets of field windings at right-angles, one set providing a constant excitation, while the other set consists of a winding traversed by a constant current and a shunt winding, and means for reversing the polarity of said last named shunt winding.

19. A method of starting a pair of direct current series motors consisting in running up an auxiliary machine serving as a source of electromotive force, switching said machine into opposition with the mains, switching the two motors into series with said machine and the mains and automatically decreasing the voltage of said machine until said motors have run up to speed in series, reversing said machine increasing the voltage of said machine up to the voltage of the mains, connecting said motors in parallel and cutting said machine out of circuit.

20. A method of stopping two direct current series motors consisting in opening the circuits of the motors, reversing the field connections of the motors and connecting the motors in series with one another, with the mains and with an auxiliary machine serving as a source of electromotive force in opposition to that of the mains so that energy may be returned to the mains.

21. A method of stopping two direct current series motors consisting in opening the circuits of the motors, reversing the field connections of the motors and connecting the motors in series with one another, with the mains and with an auxiliary machine serving as a source of electromotive force in opposition to that of the mains so that energy may be returned to the mains, and regulating the field of the auxiliary machine in order that no dangerous current may pass.

22. An electrical system comprising in combination mains, two separate means for transforming from mechanical to electrical energy, connections joining one terminal of each of said means to one of the mains, a motor-generator apparatus one part of which is adapted to work with varying voltage and constant current, connections inserting said part between the two energy transforming means so that the two means and the said part are in series between the mains.

23. An electrical system comprising in combination a motor-generator apparatus, one part of which is adapted to work with varying voltage and constant current, a pair of mains, two motors, means for connecting said motors and said motor-generator part in series across the mains, said part lying between the two motors.

In witness whereof I have hereunto signed my name this 23d day of May, 1912, in the presence of two subscribing witnesses.

FERNAND CUMONT.

Witnesses:
ALPHONSE MÉJEAN,
H. C. COXE.

Copies of this patent may be obtained for five cents each, by addressing the "Commissioner of Patents, Washington, D. C."